United States Patent [19]

Müller et al.

[11] 4,255,569
[45] Mar. 10, 1981

[54] PROCESS FOR THE PRODUCTION OF ISOCYANURATE POLYISOCYANATES, AND PRODUCTS BY THE PROCESS

[75] Inventors: Hans-Jürgen Müller; Rudolf Hombach, both of Cologne; Manfred Dollhausen, Odenthal; Joachim Zirner, Leverkusen, all of Fed. Rep. of Germany

[73] Assignee: Bayer Aktiengesellschaft, Leverkusen, Fed. Rep. of Germany

[21] Appl. No.: 36,128

[22] Filed: May 4, 1979

Related U.S. Application Data

[63] Continuation of Ser. No. 832,497, Sep. 12, 1977, abandoned.

[30] Foreign Application Priority Data

Sep. 15, 1976 [DE] Fed. Rep. of Germany ....... 2641380

[51] Int. Cl.$^3$ ............................................ C07D 251/34
[52] U.S. Cl. ..................................... 544/193; 544/222
[58] Field of Search ............................... 544/222, 193

[56] References Cited

U.S. PATENT DOCUMENTS

| | | | |
|---|---|---|---|
| 2,952,665 | 9/1960 | Bunge et al. | 544/221 |
| 3,517,002 | 6/1970 | Heiss | 544/222 |
| 3,619,338 | 11/1971 | Gilman et al. | 544/222 |
| 3,631,000 | 12/1971 | Argabright et al. | 544/222 |
| 3,641,024 | 2/1972 | Argabright et al. | 544/222 |
| 3,773,695 | 11/1973 | Argabright et al. | 544/222 |
| 3,919,218 | 11/1975 | Schmitt et al. | 544/222 |
| 3,996,223 | 12/1976 | Gupta et al. | 544/193 |

*Primary Examiner*—John M. Ford
*Attorney, Agent, or Firm*—Gene Harsh; Joseph C. Gil; R. Brent Olson

[57] ABSTRACT

The instant invention is directed to a process for the production of isocyanate polyisocyanates containing at least 50%, by weight, of tris-isocyanatomonoisocyanurates and at most 3%, by weight, of isocyanurate-free diisocyanate. The process comprises catalytically trimerizing the organic diisocyanates free from isocyanurate groups and terminating the trimerization reaction by deactivation of the catalyst after 5 to 40% of the isocyanate groups of the isocyanurate-free diisocyanate have been trimerized. The unreacted isocyanurate-free diisocyanate is then distilled off in the presence of from 1 to 30%, by weight, based on the end product obtained as distillation residue, of an inert liquid distillation aid which boils at a temperature at least 50° C. above the boiling point of the isocyanurate-free diisocyanate.

The invention is also directed to the products produced by this process.

3 Claims, No Drawings

PROCESS FOR THE PRODUCTION OF ISOCYANURATE POLYISOCYANATES, AND PRODUCTS BY THE PROCESS

This is a continuation of application Ser. No. 832,497 filed Sept. 12, 1977, now abandoned.

BACKGROUND OF THE INVENTION

Polyisocyanates of isocyanurate structure are obtained by the trimerization of organic diisocyanates (cf. German Patents Nos. 951,168; 1,013,869; 1,112,285; 1,022,789 and 1,203,792; British Pat. Nos. 809,809; 821,158; 837,120; 856,372; 972,173; 920,080; 952,931; 944,309; 954,095; 962,689; 966,338; 941,379 and 949,253; U.S. Pat. Nos. 3,154,522 and 2,801,244; French Patent No. 1,510,342; and Belgian Patent No. 718,994).

Depending upon the degree of trimerization (percentage of the isocyanate groups in the diisocyanate used as starting material which are trimerized), the polyisocyanate mixtures of isocyanurate structure obtainable by this process contain, in addition to tris-isocyanato-isocyanurates, variable amounts of unreacted starting diisocyanate and higher polyisocyanates, i.e. polyisocyanates containing several isocyanurate rings. Thus, it is generally necessary, in order to minimize the content of free monomeric diisocyanate, to trimerize more than 60% of the isocyanate groups present in the diisocyanate used as starting material. This leads to the relatively high molecular weight products just mentioned, the properties of which are inadequate for numerous applications. Polyisocyanate mixtures of this type having an increased content of relatively high molecular weight polyisocyanato-polyisocyanurates are only suitable to a limited extent, for example, as cross-linkers for adhesives or elastomers, as polyisocyanate component in the production of polyurethane foams or as hardeners for low-solvent polyurethane lacquers.

The application of keeping the degree of trimerization below 60%, and preferably below 50%, in order to avoid the formation of relatively high molecular weight products, so that the excess diisocyanate used as starting material may subsequently be separated from the end product, is accompanied by considerably practical difficulties. Despite elaborate installations, the high melting point of polyisocyanates containing isocyanurate groups, the pronounced tendency thereof towards solidification or crystallization and the high viscosity of the melts tend to combine to make the distillation installations highly unreliable in operation. The outcome is thermal overstressing and, hence, decomposition and polymerization of the polyisocyanurate polyisocyanates.

DESCRIPTION OF THE INVENTION

The present invention provides a process for the production of polyisocyanates of isocyanurate structure which are distinguished both by a particularly low content of starting diisocyanate and by a particularly high content of tris-isocyanato-isocyanurates, coupled with the fact that thermal overstressing of the end product is largely avoided. The result of this is the formation of polyisocyanates of isocyanurate structure having a particularly low iodine color index according to DIN 6162.

The present invention relates to a process for the production of polyisocyanates of isocyanurate structure containing at least 50%, by weight, of tris-isocyanatomono-isocyanurates and at most 3%, by weight, of diisocyanate free from isocyanurate groups by catalytically trimerizing isocyanurate-free organic diisocyanates and terminating the trimerization reaction by deactivation of the catalyst after from 5 to 40% of the isocyanate groups in the isocyanurate-free diisocyanate have been trimerized, wherein upon termination of the trimerization reaction, the unreacted isocyanurate-free diisocyanate still present in the reaction mixture is removed therefrom by distillation, distillation being carried out in the presence of from 1 to 30%, by weight, based on end product obtained as distillation residue, of a liquid distillation aid which is inert under the distillation conditions and which boils at a temperature at least 50° C. above the boiling point of the isocyanurate-free diisocyanate.

The process according to the present invention is particularly suitable for the production of the corresponding polyisocyanates of isocyanurate structure from isocyanate-group-containing diisocyanates of different reactivity, such as, preferably, 2,4-diisocyanatotoluene or mixtures of this diisocyanate with 2,6-diisocyanatotoluene and 1-isocyanato-3,3,5-trimethyl-5-isocyanatomethyl cyclohexane.

Accordingly, the present invention also relates to polyisocyanates of isocyanurate structure obtained by the partial trimerization of the isocyanate groups of 2,4-and, optionally, 2,6-diisocyanatotoluene, characterized by a content of at least 50%, by weight, of tris-(isocyanato-tolyl)-isocyanurate and a content of less than 3%, by weight, of free 2,4- and/or, 2,6-diisocyanatotoluene.

The present invention also relates to polyisocyanates of isocyanurate structure obtained by the partial trimerization of the isocyanate groups of 1-isocyanato-3,3,5-trimethyl-5-isocyanatomethyl cyclohexane, characterized by a content of at least 50%, by weight, of tris-[(1,3,3-trimethyl-5-isocyanatocyclohexyl)-methyl]-isocyanurate and a content of less than 3%, by weight, of free 1-isocyanato-3,3,5-trimethyl-5-isocyanatomethyl cyclohexane.

It has also been found that the above-mentioned polyisocyanates of isocyanurate structure based on 2,4- and, optionally, 2,6-diisocyanatotoluene are particularly valuable cross-linkers and adhesion promoters for adhesives based on natural and synthetic rubber. They are superior in the light natural color thereof and/or in the adhesion properties thereof to the known polyisocyanates hitherto used for this particular application (German Patents Nos. 1,311,001 and 1,812,565). In addition, all the polyisocyanates of isocyanurate structure obtainable in accordance with the present invention are particularly suitable for use as the isocyanate component in two-component polyurethane lacquers.

The present invention also relates to two-component polyurethane lacquers and additives in adhesives based on natural or synthetic rubber comprising the above-mentioned polyisocyanates of isocyanurate structure.

The distillation aids used in the process according to the present invention are substantially involatile substances which are liquid and inert to isocyanate groups under the distillation conditions and of which the boiling point at normal pressure is at least 50° C. higher than the boiling point of the isocyanate to be distilled off.

The distillation aids are generally added before working-up by distillation. However, they may also be added to the isocyanurate-free diisocyanate used as starting material which is then trimerized in the presence of the distillation aid.

Distillation aids preferably used in accordance with the present invention are:
(1) plasticizers,
(2) natural and synthetic resins, oils and fats; and
(3) polyisocyanato-polyurethanes having a molecular weight of from 400 to 20,000.

According to the present invention, particularly preferred distillation aids are polyisocyanato-urethanes of the type obtained by reacting hydroxyl compounds having a molecular weight of from 32 to 4,000 with excess isocyanates. These particularly preferred distillation aids are preferably produced in situ by adding subequivalent amounts of the hydroxyl compounds to the reaction mixture to be worked-up by distillation. It is also possible, although less preferred, to add the hydroxyl compound before the trimerization reaction.

From 1 to 30%, by weight, preferably from 2 to 15%, by weight, of distillation aid, based on the total quantity of end product (distillation residue), are generally used in the process according to the present invention. In the above-mentioned in situ production of the distillation aid, the hydroxyl compound is used in such a quantity that the content of the polyisocyanato-urethane formed in situ in the mixture to be distilled corresponds to the quantitative ratios mentioned above.

The starting materials used for the process according to the present invention are, in particular, organic diisocyanates free from isocyanurate groups. Examples of these diisocyanates include ethylene diisocyanate; tetramethylene diisocyanate; hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane; 2,4- and 2,6-hexahydrotolylene diisocyanate and mixtures of these isomers; hexahydro-1,3- and/or 1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; and naphthylene-1,5-diisocyanate. It is also possible, although not preferred, to use monoisocyanates, such as phenyl isocyanate, or more highly functional polyisocyanates, such as the reaction product of 3 mols of 2,4-diisocyanatotoluene with 1 mol of trimethylol propane.

The process according to the present invention is preferably carried out using diisocyanates containing isocyanate groups of different reactivity and using diisocyanate mixtures containing at least 50%, by weight, of a diisocyanate having isocyanate groups of different reactivity. Examples of these preferred starting materials are: 2,4-diisocyanatotoluene and mixtures with 2,6-diisocyanatotoluene in which the proportion of 2,6-diisocyanatotoluene may amount to 35%, by weight; 1-isocyanato-3,3,5-trimethyl-5-isocyanatomethyl cyclohexane and 2,4'-diisocyanatodiphenyl methane; and mixtures of 2,4'-diisocyanatodiphenyl methane with 4,4'-diisocyanatodiphenyl methane and, optionally, up to 5%, by weight, based on the total mixture, of 2,2'-diisocyanatodiphenyl methane, in which the proportion of 4,4'-diisocyanatodiphenyl methane may amount to 50%, by weight. It is particularly preferred to use the above-mentioned diisocyanatotoluenes in the process according to the present invention.

The trimerization reaction is carried out in known manner, for example, as described in German Patents Nos. 951,168; 1,013,869; 1,112,285; 1,022,798 and 1,203,792; in British Pat. Nos. 809,809; 821,158; 837,120; 856,372; 927,173; 920,080; 952,931; 944,309; 954,095; 962,689; 966,338; 941,379 and 949,253; in U.S. Pat. Nos. 3,154,522 and 2,801,244; in French Patent No. 1,510,342; and in Belgian Patent No. 718,994.

The trimerization reaction is generally carried out at from 40° to 120° C. in the presence of conventional trimerization catalysts. The trimerization reaction is generally terminated at a trimerization degree of from 5 to 40%, preferably from 10 to 30%, by deactivation of the catalyst. This deactivation of the catalyst may consist either in the addition of a catalyst poison or in a thermal decomposition of the catalyst. Normally there exists a catalyst poison for each trimerisation catalyst whereas the second method of deactivation is only possible in the case of thermal sensitive catalysts such as i.e. the Mannich bases mentioned hereinafter.

The catalyst/catalyst poison combinations mentioned in the above mentioned literature references may be used for this purpose.

However, preferred catalysts are the Mannich bases. The Mannich bases used are preferably those known compounds based on phenols, such as may be obtained in known manner by subjecting phenols to a Mannich reaction (cf. R. Schroter: Houben-Weyl, Meth.d.org. Chemie 11,1 pages 756 et seq (1957)) with aldehydes (in the context of the present invention, "Mannich bases" are also condensation products of the type produced using aldehydes other than formaldehyde, such as, in particular, benzaldehyde), preferably formaldehyde and secondary amines, preferably dimethyl amine. Mononuclear or polynuclear Mannich bases having at least one dialkylaminobenzyl group in the molecule in addition to phenolically-bonded hydroxyl groups are obtained by suitably selecting the molar ratios between the starting compounds. To produce the Mannich bases preferably used in accordance with the present invention, from 1 to 3 mols of aldehyde and from 1 to 3 mols of secondary amine are generally used per mol of phenol.

Suitable phenols for producing the Mannich bases preferably used in the present invention are monohydric or polyhydric phenols containing at least one CH-bond condensable with respect to formaldehyde in the o- and/or p-position to the phenolic hydroxyl groups. Examples are phenols, such as cresols, xylenols, dihydroxy benzenes, nonyl phenols, nonyl cresols, tert-butyl phenols, isodecyl phenols, ethyl phenols, etc. The phenols used may also be substituted by such substituents as chlorine or bromine. Instead of using these mononuclear phenols, it is also possible to use polynuclear phenols, such as 4,4'-dihydroxy diphenyl methane, tetrachloro- and tetrabromo-4,4'-dihydroxy diphenyl methane, 4,4'-dihydroxy diphenyl or 2,4-dihydroxy diphenyl methane.

The aldehyde preferably used is formaldehyde in the form of an aqueous formalin solution or in the form of paraformaldehyde or trioxane. Mannich bases produced using other aldehydes, such as butyl aldehyde or benzaldehyde, are also suitable.

The preferred secondary amine is dimethyl amine. However, other secondary aliphatic amines containing $C_1$-$C_{18}$ alkyl radicals may be used. These include compounds such as N-methyl butyl amine; cycloaliphatic secondary amines corresponding to the following general formula: $HN(R_1)R_2$ (wherein $R_1$ represents $C_1$-$C_4$ alkyl and $R_2$ represents $C_5$-$C_7$ cycloalkyl), such as N-methyl cyclohexyl amine; or even heterocyclic secondary amines, such as piperidine, pyrrolidine or morpholine.

Mannich bases based on other C-H-acid compounds, for example, based on indole, are also suitable, though less preferred.

The following are typical examples of Mannich bases suitable for use in the process of the present invention:

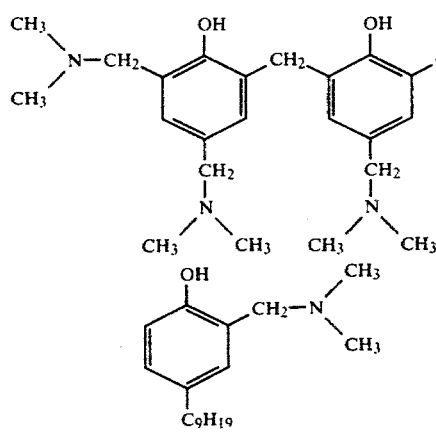

(III): from bisphenol A, dimethylamine and formaldehyde [references (1), (2)]

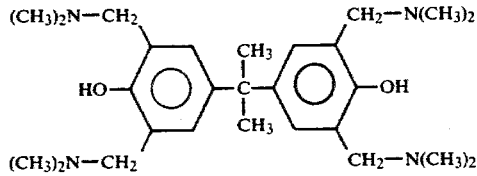

(IV): from bisphenol A, dimethylamine and formaldehyde [references (1), (2)]

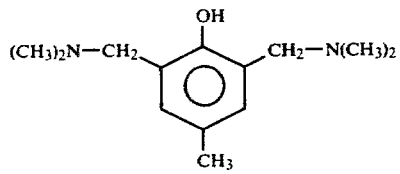

(V): form p-cresol, dimethylamine and formaldehyde [references (1), (2)]

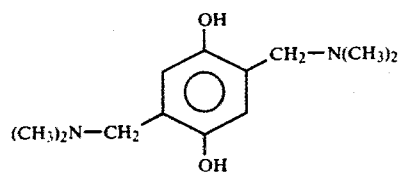

(VI): from p-hydroquinone, dimethylamine and formaldehyde [references (1), (2)]

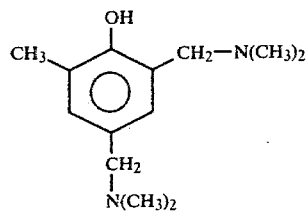

(VII): from o-cresol dimethylamine and formaldehyde [references (1), (2)]

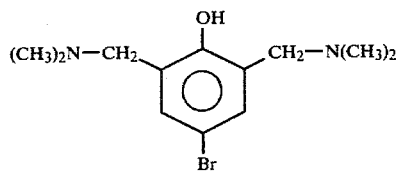

(VIII): from p-bromophenol, dimethylamine and formaldehyde [references (1), (2)]

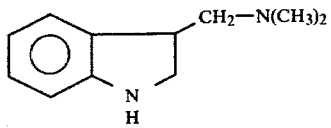

(IX): from indole, dimethylamine and formaldehyde [reference (3)].

These types of Mannich bases may be found in
(1) Houben-Weyl, Methoden der org. Chemie XI, 1, page 756 (1957)
(2) J. Decombe, C.r. 196, page 866 et seq (1933) C.r. 197, page 258 et seq (1933)
(3) H. R. Snyder; C.W. Smith and J.M. Stewart, Am. Soc. 66, page 200 et seq (1944).

Suitable catalyst poisons for stopping the reaction of the present invention include in particular, alkylating agents and acylating agents, such as dimethyl sulphate, toluene sulphonic acid methyl ester, benzoyl chloride or acetyl chloride. Any compounds which are capable of quarternizing or neutralizing the Mannich bases may be used.

The activity of the catalysts of the present invention varies and is also governed by temperature. At temperatures of $\geq 60°$ C., the Mannich bases undergo gradual decrease in activity. The activity eventually disappears altogether and the polymerization reaction comes to a standstill. Thus, the reaction may also be brought to a standstill by briefly heating the reaction mixture to a temperature of $>60°$ C. by an external heat source.

By virtue of this possibility of stopping the reaction, the process is also suitable for the continuous trimerization of organic polyisocyanates.

The trimerization reaction takes place at a temperature of from 20° to 80° C. and preferably at a temperature of from 20° to 60° C. In order to thermally deactivate these catalysts it is sufficient to heat the reaction mixture to a temperature within the range of about 100° to about 150° C. for a period of time of i.e. 10 minutes to 2 hours.

The quantity in which the catalyst is used is governed by the type of catalyst used. In general, the Mannich base or Mannich base mixture is added in a concentration of from 50 to 50,000 ppm and preferably in a concentration of from 200 to 2500 ppm, based on the starting polyisocyanate. The exothermic reaction begins following the addition of the catalyst, the reaction mixture being maintained at a temperature of from 20° to 60° C. and preferably at a temperature of from 30° to 50° C. throughout the entire trimerization time.

After the trimerization reaction has been terminated, the distillation aid is added and the unreacted starting diisocyanate is removed by distillation, distillation being carried out in apparatus normally used for the distillation of heat-sensitive mixtures, such as thin layer evaporators. In general, distillation is carried out under a vacuum of from 0.1 to 10torr.

Typical examples of plasticizers suitable for use as distillation aids include carboxylic acid esters, such as dibutyl phthalate and dioctyl phthalate; phosphoric acid esters, such as tributyl phosphate, trihexyl phosphate, triphenyl phosphate, diphenyl cresyl phosphate, trichloroethyl phosphate and tribenzyl phosphate; chlorinated paraffin hydrocarbons; chlorinated aromatic hydrocarbons, such as chlorinated diphenyl; or esters of higher sulphonic acids, such as diphenyl esters of lauryl sulphonic acid, palmitic sulphonic acid or stearyl sulphonic acid.

Examples of natural or synthetic resins, oils or fats suitable for use as distillation aids include neat's-foot oil or turkey red oil.

Examples of polyisocyanato-polyurethanes having molecular weights of from 400 to 20,000 (which, as mentioned above, are preferably formed in situ) suitable for use as distillation aids are reaction products of polyisocyanates, preferably of the type present in the reaction mixture after the trimerization reaction, with sub-equivalent amounts of alcohols, preferably containing aliphatically bound hydroxyl groups and having molecular weights of from 32 to 4,000. Such useful alcohols include: simple alcohols, such as methanol, ethanol, isopropanol, lauryl alcohol, stearyl alcohol, 2-ethoxy ethanol, 3-butoxy propanol, ethylene glycol, 1,3-butane diol, 1,4-butane diol, 1,6-hexane diol, 1,14-tetradecane diol and trimethylol propane; polyether or polyester alcohols containing one or more hydroxyl groups of the type known in polyurethane chemistry, such as may be obtained by ethoxylating and/or propoxylating the above-mentioned low molecular weight alcohols or by reacting them with sub-equivalent amounts of carboxylic acids, preferably dicarboxylic acids, such as adipic acid, phthalic acid or maleic acid. Polyols having at least two hydroxyl groups and a molecular weight above 100 are preferred.

It is possible by the process according to the present invention to obtain isocyanurate-group-containing polyisocyanates which contain at least 50% of tris-isocyanatoisocyanurate and at most 3%, preferably at most 0.5%, of unreacted starting diisocyanate. Such polyisocyanates of isocyanurate structure are valuable starting materials for the production of polyurethane plastics by the isocyanate-polyaddition process. They may be processed either as such or in the form of solutions in suitable alcohols, such as ethyl acetate, butyl acetate, methyl ethyl ketone, ethyl glycol acetate or methylene chloride, and are suitable for the production of lacquer coatings, polyurethane foams or solid polyurethane-based moldings. They may optionally be processed in admixture with the polyisocyanates commonly encountered in polyurethane chemistry.

The isocyanuric acid derivative containing free isocyanate groups which is formed as a result of the particularly preferred use of 2,4- and/or 2,6-diisocyanatotoluene is a particularly valuable polyisocyanate which may be used as a cross-linking agent and adhesion promoter in adhesives of natural or synthetic rubber. It is characterized by a content of at least 50%, by weight, of tris-isocyanatotolyl isocyanurate and by a content of less than 3%, by weight, preferably less than 0.5%, by weight, of 2,4- or 2,6-diisocyanatotoluene and, in addition, also contains polyisocyanates having more than one isocyanurate ring.

As an additive for adhesives based on natural or synthetic rubber, it is distinctly superior to the polyisocyanates hitherto recommended for this particular application, for example 4,4', 40"-tris-isocyanatotriphenyl methane, the isocyanatoaryl phosphoric acid and thiophosphoric acid derivatives according to German Patent No. 1,311,001 or the substituted diphenyl methane tetraisocyanates according to German Patent No. 1,812,565 with regard to its virtually non-existent natural color and/or with regard to its adhesion properties.

It is also advantageously distinguished from conventional isocyanate group-containing trimerizates based on diisocyanatotoluene by its virtually non-existent natural color and/or by its excellent adhesion properties.

The isocyanuric acid derivative containing isocyanate groups according to the present invention may be used in adhesives based on natural or synthetic rubber. The adhesives in question are preferably solvent-containing adhesives.

Examples of suitable synthetic rubbers are polymers of dienes, such as butadiene. Also preferred are copolymers of dienes, such as butadiene with mono-olefinically unsaturated compounds. Preferred mono-olefinically unsaturated compounds include vinyl derivatives, such as, styrene, acrylonitrile, methacrylonitrile; polyhydroxyl polyethers or polyhydroxy polyesters or polyurethanes produced therefrom; or polymers and copolymers of 2-chloro-1,3-butadiene with other polymerizable olefinically unsaturated monomers. Preferred binders for the adhesives are the polymers and copolymers of 2-chloro-1,3-butadiene. Also preferred are linear or substantially linear hydroxyl polyurethanes produced from esters of dicarboxylic acids and alkane diols or produced from lactones, such as caprolactone. Also preferred are aromatic or aliphatic diisocyanates, such as diisocyanatotoluenes, 4,4'-diisocyanatodiphenyl methane, or hexamethylene diisocyanate.

Depending upon the base polymer, the solvents that may be used for these adhesives include aliphatic hydrocarbons, aromatic hydrocarbons, toluene, chlorinated hydrocarbons, ketones, or mixtures of these solvents. In order to modify the adhesion properties thereof, such as obtaining a particularly long-lasting contact binding effect or increasing strength of cohesion, the adhesives may contain other substances in addition to the above-mentioned binders. Some possible additional additives are natural, modified natural or synthetic resins. Also, other polymers may be added such as, chlorinated rubber, soluble polymers, copolymers of vinyl acetate, or other vinyl compounds.

In the use according to the present invention, the diisocyanatotoluene-based isocyanuric acid derivative containing isocyanate groups according to the present invention is preferably used in quantities of from 2 to 15%, by weight, based on natural or synthetic rubber. In order to obtain rapid and homogeneous distribution, it is best to add the isocyanate group-containing isocyanuric acid derivatives according to the present invention in the form of from 10 to 50%, by weight, solutions in suitable solvents to the natural or synthetic rubber adhesives which are generally from 10 to 30%, by weight, solutions of these polymers.

The adhesives are suitable for bonding any materials of the same or different type, for example for bonding leather, textiles, plastics and wood; however, they are preferably used for bonding rubber or flexible polyvinyl chloride materials.

The isocyanate group-containing isocyanuric acid derivatives obtainable by the process according to the present invention (especially the derivative based on 1-isocyanato-3,3,5-tri-methyl-5-isocyanatomethyl cyclohexane) are particularly valuable polyisocyanates for light-stable two-component polyurethane lacquers. For this particular application, the polyisocyanates obtainable in accordance with the present invention may be combined with the reactants and auxiliaries commonly used in polyurethane lacquers (cf. for example, Kunststoff-Handbuch, Vol. VII, "Polyurethane", Carl Hanser Verlag Munich (1966), pages 21 et seq.)

EXAMPLES

EXAMPLE 1

Production of a Mannich base suitable for use in the present invention 720 parts, by weight, of a 25% aqueous dimethyl amine solution are added to 188 parts, by weight, of phenol, followed by the addition over a period of 30 minutes of 425 parts, by weight, of a 40% formalin solution. The reaction mixture is then heated for one hour to approximately 30° C. and then for another 2 hours to 80° C. After 2 hours at 80° C., the organic phase is separated off from the aqueous phase by the addition of sodium chloride and the organic phase is concentrated at from 80° to 90° C./10-20 Torr. 390 parts, by weight, of a condensation product are obtained which has a nitrogen content of 13.5% and a viscosity of approximately 500 cP at 25° C. The Mannich base is essentially a mixture of homologous compounds. The mixture contains approximately 55% of the Mannich base:

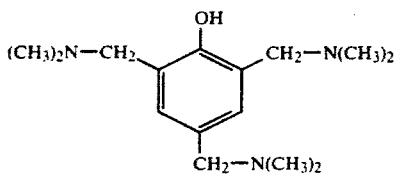

and approximately 20% of the Mannich base:

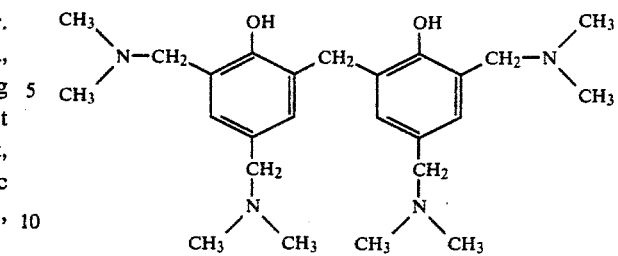

EXAMPLE 2

Production of a Mannich base suitable for use in the present invention 220 parts, by weight, of p-isononyl phenol and 45 parts, by weight, of dimethyl amine in the form of a 25% aqueous solution are initially introduced at about 25° C., followed by the addition over a period of 30 minutes of 30 parts, by weight, of formaldehyde in the form of a 40% aqueous solution. After a reaction time of one hour at 30° C., the temperature is increased to 80° C. over a period of 2 hours and left at that level for another 2 hours. The organic phase is then separated off from the aqueous phase by the addition of sodium chloride and the organic phase is concentrated at 70° C./12 Torr. After concentration, any organic constituents present are separated off by filtration. 264 parts, by weight, of Mannich base having a viscosity of 218 cP at 25° C. are obtained.

The Mannich base is essentially characterized by the formula:

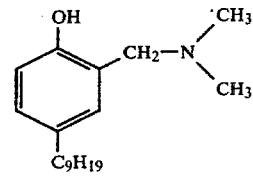

EXAMPLE 3 (Production Example)

1 parts by weight of a mixture of 65%, by weight, of 2,4- and 35%, by weight, of 2,6-tolylene diisocyanate and 0.26 part by weight of the Mannich base produced from phenol, dimethyl amine and formaldehyde in accordance with Example 1 are mixed at 45° C. The trimerization reaction which begins immediately is continued with stirring in the absence of moisture at 45±2° C. until the NCO-content has fallen to 42%, by weight. The trimerization reaction is stopped by the addition of 0.65 part, by weight, of o/p-toluene sulphonic acid methyl ester and by stirring the reaction mixture for 1 hour at 60° C. The reaction mixture is then mixed with 13.0 parts, by weight, of an adipic acid-ethylene glycol polyester having an OH-number of 56, followed by stirring for 1 hour at 60° C. Thereafter, the NCO-content has fallen to 41.4%, by weight.

The excess monomeric isocyanate is then separated off in vacuo by means of a thin-layer evaporator (thin-layer evaporator type Sambay manufactured by Samesreuther-Müller-Schuss, Germany). The same type of thin-layer evaporator was also used in the following examples. The resin isolated contains 0.3%, by weight, of free monomeric tolylene diisocyanate and 72%, by weight, of tris-(isocyanatotoluene)-isocyanurate.

The resin was dissolved in ethyl acetate in such a quantity that the solution has an NCO-content of 7%, by weight. The iodine color index according to DIN 6162, a measure of the natural color, amounted to 2.

EXAMPLE 4 (Use)

Two adhesives were produced using the polyisocyanate solution described in Example 3.

Polyurethane adhesive

A substantially linear hydroxyl group-containing polyurethane having a molecular weight of about 100,000, which had been produced from a hydroxyl group-containing adipic acid/ethylene glycol polyester having a molecular weight of about 2000 and 2,4-diisocyanato-toluene, was dissolved in methyl ethyl ketone to form an approximately 20% solution having a viscosity of 20 poises at 20° C. 100 parts of this polyurethane solution were thoroughly mixed with 10 parts of the polyisocyanate solution of Example 3.

Polychloroprene adhesive 50 parts of chloroprene rubber having a strong tendency towards crystallization and a Mooney value of 84 according to DIN 53523 and 50 parts of chloroprene rubber having a medium tendency towards crystallization and a Mooney value of 100 were thoroughly masticated on water-cooled mixing rolls. 4 parts of magnesium oxide and 4 parts of zinc oxide were worked in during mastication. The rough sheet formed was dissolved in a mixture of ethyl acetate, petrol (boiling range 65°–95° C.) and toluene in a ratio, by weight, of 2:2:1 to form a solution having a viscosity of 20 poises at 20° C. The solution had a solids content of about 23%. 100 parts of this solution were mixed with 10 parts of the described isocyanate solution.

The two adhesives were tested on the four test materials described below which correspond to conventional sole materials.

Test material A: Natural rubber rubber-sole material having a silicate filler content of 40%. Shore-A-hardness 70 according to DIN 53505.

Test material B: Styrene-butadiene rubber-sole material having a silicate filler content of about 40%. Shore-A-hardness 70 according to DIN 53505.

Test material C: Oil-extended styrene-butadiene rubber having an oil content of 37.5% and a silicate filler content of 40%. Shore-A-hardness 60 according to DIN 53505.

Test material D: Natural rubber-sole mixture containing 20% of a resin of high styrene content. Silicate filler content 60%. Shore-A-hardness 90 according to DIN 53505.

To test the adhesive mixtures, test specimens were made up from the test materials in accordance with DIN 53274. Before application of the adhesive, the rubber material was thoroughly roughened with grade 40 sandpaper. The adhesive was applied twice on both sides. The layers of adhesive were then irradiated for 4 minutes using 250 watt infra-red lamps arranged at a distance of 25 cm, after which the bond was made and pressed for 5 minutes at 3.5 atms gauge. After bonding, the test specimens were first stored for 9 days at 20° C. The delamination strengths determined in the delamination test carried out in accordance with DIN 53274 (20° C.; spindle advance 100 mm/minute) are set out in the following table:

|  | Delamination strength kp/cm Test material | | | |
| --- | --- | --- | --- | --- |
|  | A | B | C | D |
| PU-adhesive | 7.0 | 9.1 | 8.5 | 10.5 |
| CR-adhesive | 4.4 | 7.2 | 5.5 | 6.1 |

In order to determine resistance to heat, test specimens which had been stored for 9 days were subjected to a brief durability test in which the period of time for which the bond withstood the specified load of 1.0 kp/cm at a temperature of 50° C. was determined. The results obtained are set out in the following Table:

|  | Heat resistance in the durability test (mins) | | | |
| --- | --- | --- | --- | --- |
|  | Test material | | | |
|  | A | B | C | D |
| PU-adhesive | 124 | >180 | >180 | >180 |
| CR-adhesive | 33 | 31 | 27 | >180 |

EXAMPLE 5 (Production Example)

1,000 parts by weight of a mixture of 65% by weight of 2,4- and 35%, by weight, of 2,6-tolylene diisocyanate and 0.26 part, by weight, of the Mannich base used in EXAMPLE 3 are mixed at 45° C. The trimerization reaction which begins immediately is continued with stirring in the absence of moisture at 45±2° C. until the NCO-content has fallen to 35%, by weight. By adding 0.65 part, by weight, of o/p-toluene sulphonic acid methyl ester and stirring the reaction mixture for 1 hour at 80° C., the trimerizaton reaction is stopped. The reaction mixture is then mixed with 27.5 parts, by weight, of an adipic acid/ethylene glycol polyester having an OH-number of 56, followed by stirring for 1 hour at 80° C. Thereafter, the NCO-content has fallen to 34%, by weight.

The excess monomeric isocyanate is separated off in vacuo by means of a thin-layer evaporator. The resin isolated contains 0.3%, by weight, of free monomeric tolylene diisocyanate and 55%, by weight, of tris-(isocyanatotolyl)-isocyanurate.

The resin was dissolved in ethyl acetate in such a quantity that the solution has an NCO-content of 7%, by weight.

The iodine color index according to DIN 6162, which is a measure of the natural color, amounted to 2.

EXAMPLE 6 (Use)

Test material bonds were produced in the same way as in Example 4 using the polyisocyanate solution described in Example 5 and tested.

|  | Delamination strength kp/cm Test material | | | |
| --- | --- | --- | --- | --- |
|  | A | B | C | D |
| PU-adhesive | 5.2 | 6.9 | 5.7 | 8.6 |
| CR-adhesive | 4.0 | 5.8 | 4.4 | 4.2 |
| Heat resistance in the durability test (mins) | | | | |
| PU-adhesive | 82 | >180 | >180 | >180 |

| | | | | |
|---|---|---|---|---|
| CR-adhesive | 21 | 15 | 12 | >180 |

EXAMPLE 7

(Production without the working-up by distillation essential to the present invention for comparison)

1,000 parts by weight of 2,4-tolylene diisocyanate and 1 part by weight of tributyl phosphine are stirred for 20 hours in the absence of moisture at a temperature of 110±2° C. The trimerization reaction is then stopped at 110° C. by the addition of 2.5 parts, by weight, of p-toluene sulphonic acid methyl ester. The cooled product is a golden yellow oil having an NCO-content of 33.7%. It contains 39%, by weight, of monomeric 2,4-tolylene diisocyanate and 26%, by weight, of tris-(isocyanatotolyl)-isocyanurate. The oil is dissolved in ethyl acetate in such a quantity that the solution has an NCO-content of 7%, by weight. The iodine color index according to DIN 6162, which is a measure of the natural color, amounts to from 120 to 160.

EXAMPLE 8 (Comparison)

Test material solutions are prepared in the same way as in Example 4 using the polyisocyanate solution described in Example 7 and tested.

| | Delamination strength (kp/cm) Test Material | | | |
|---|---|---|---|---|
| | A | B | C | D |
| PU-adhesive | 3.9 | 6.0 | 4.6 | 8.0 |
| CR-adhesive | 3.2 | 5.1 | 4.1 | 3.6 |
| | Heat resistance in the durability test (mins.) | | | |
| PU-adhesive | 60 | >180 | >180 | >180 |
| CR-adhesive | 15 | 9 | 4 | 100 |

EXAMPLE 9 (Comparison)

A 20%, by weight, solution of tris-(p-isocyanatophenyl)-methane in methylene chloride is used as the polyisocyanate. The NCO-content amounted to 7.1%, by weight. The iodine color index according to DIN 6162 was greater than 1100.

Test material bonds were produced in the same way as in Example 4 using this polyisocyanate solution and subsequently tested.

| | Delamination strength kp/cm Test Material | | | |
|---|---|---|---|---|
| | A | B | C | D |
| PU-adhesive | 5.3 | 7.2 | 5.9 | 8.8 |
| CR-adhesive | 4.3 | 6.0 | 4.7 | 4.4 |
| | Heat resistance in the durability test (mins.) | | | |
| PU-adhesive | 80 | >180 | >180 | >180 |
| CR-adhesive | 19 | 12 | 8 | 106 |

EXAMPLE 10 (Comparison)

A 20%, by weight, solution of thiophosphoric acid-tris-(p-isocyanatophenyl)-ester in methylene chloride was used as the polyisocyanate. The NCO-content amounted to 5.6%, by weight, while the iodine color index according to DIN 6162 amounted to 20.

Test material bonds were produced in the same way as in Example 4 using as polyisocyanate solution and subsequently tested

| | Delamination strength kp/cm Test Material | | | |
|---|---|---|---|---|
| | A | B | C | D |
| PU-adhesive | 4.1 | 7.1 | 4.5 | 7.5 |
| CR-adhesive | 2.6 | 5.1 | 3.3 | 4.6 |
| | Heat resistance in the durability test (mins.) | | | |
| PU-adhesive | 41 | 65 | >180 | >180 |
| CR-adhesive | 17 | 12 | 10 | 56 |

Example 11 (Comparison)

A 20%, by weight, solution of 3,3'-dimethyl triphenyl methane-4,4', 6,6'-tetraisocyanate in methylene chloride was used as the polyisocyanate. The NCO-content amounted to 7.0%, by weight, while the iodine color index according to DIN 6162 amounted to 40.

Test material bonds were produced in the same way as in Example 3 using this polyisocyanate solution and subsequently tested.

| | Delamination strength kp/cm Test Material | | | |
|---|---|---|---|---|
| | A | B | C | D |
| PU-adhesive | 5.1 | 6.8 | 5.7 | 8.1 |
| CR-adhesive | 4.0 | 5.5 | 4.1 | 4.2 |
| | Heat resistance in the durability test (mins.) | | | |
| PU-adhesive | 73 | >180 | >180 | >180 |
| CR-adhesive | 20 | 15 | 15 | >180 |

From above test results (see examples 4, 6, 8 through 11) it becomes apparent that the adhesives containing the polyisocyanates of the invention permit the preparation of bonds which exhibit excellent mechanical properties and simultaneously these adhesives have a very low iodine color index whereas the polyisocyanates of the art have either a high color index or lead to bonds with clearly inferior mechanical properties.

EXAMPLE 12

(Production of an isocyanurate-isocyanate mixture to be worked-up in accordance with the present invention)

1,000 parts by weight of a mixture of 65% by weight of 2,4- and 35% by weight of 2,6-tolylene diisocyanate are mixed in the absence of moisture at a temperature of 45° C. with 0.438 part by weight of a 60% xylene solution of the Mannich base used in Example 3. The trimerization reaction begins immediately. The progress of the reaction is followed by monitoring the refractive index. When the index has fallen to $n_D 20 = 1.5810$, the reaction mixture is heated to 120° C. and subsequently stirred for 60 minutes at that temperature. The reaction mixture is then cooled to room temperature. The reaction mixture contains 23%, by weight of isocyanurate and 77%, by weight, of monomeric tolylene diisocyanate. The NCO-content amounts to 42.6%, by weight.

EXAMPLE 13

1,000 parts, by weight, of the isocyanurate-isocyanate mixture produced in accordance with Example 12 are mixed at 50° C. with 11.5 parts, by weight, of lauryl alcohol, followed by stirring for 60 minutes in the absence of moisture. The excess tolylene diisocyanate is then removed from the reaction mixture in vacuo by means of a thin-layer evaporator. The resin obtaned contains 22.9%, by weight, of NCO-groups and 0.3%, by weight, of free monomeric tolylene diisocyanate and has a melting point of from 100° to 110° C.

Example 14

1,000 parts, by weight, of the isocyanurate-isocyanate mixture produced in accordance with Example 12 are mixed at 50° C. with 23 parts, by weight, of lauryl alcohol, followed by stirring for 60 minutes in the absence of moisture. Subsequent removal of the excess tolylene diisocyanate by means of a thin-layer evaporator gives a resin having an NCO-content of 21.6%, by weight, a content of 0.3%, by weight, of free monomer tolylene diisocyanate and a melting point of from 85° to 100° C.

EXAMPLE 15

1,000 parts, by weight, of the reaction mixture produced in accordance with Example 12 are mixed at 50° C. with 34.5 parts, by weight, of lauryl alcohol, followed by stirring for 60 minutes in the absence of moisture. Subsequent removal of the excess monomeric tolylene diisocyanate in vacuo by means of a thin-layer evaporator gives a resin containing 21.0%, by weight, of NCO-groups and 0.3%, by weight, of free monomeric tolylene diisocyanate and having a melting point of from 68° to 78° C.

EXAMPLE 16

1,000 parts, by weight, of the reaction mixture produced in accordance with Example 12 are mixed at 50° C. with 12.6 parts, by weight, of a polyether having an OH-number of 26, which has been produced by the addition of propylene oxide and then ethylene oxide with butanol, about 90%, by weight of the OH-groups of which are primary OH-groups, followed by stirring for 60 minutes in the absence of moisture. Subsequent removal of the excess monomeric tolylene diisocyanate in vacuo by means of a thin-layer evaporator gives a resin having 21.7%, by weight of NCO-groups, 0.3%, by weight, of free monomeric tolylene diisocyanate and a melting point of from 105° to 113° C.

EXAMPLE 17

(Production of a polyisocyanate mixture to be worked-up in accordance with the present invention)

2,500 parts, by weight, of a mixture of 80%, by weight, of 2,4- and 20%, by weight, of 2,6-tolylene diisocyanate are mixed in the absence of moisture at 50° C. with 1.9 parts, by weight, of the Mannich base prepared in Example 1. The trimerization reaction begins immediately. The progress of the reaction is monitored by measuring the NCO-content. Once the NCO-content has fallen to 35%, by weight, the trimerization reaction is stopped by adding 4.1 ml of benozyl chloride and stirring the reaction mixture for 60 minutes at 80° C. The reaction mixture is then diluted with 900 parts, by weight, of a mixture of 80%, by weight, of 2,4- and 20%, by weight, of 2,6-tolylene diisocyanate to make it easier to handle (reduction in viscosity). The thus-obtained reaction mixture contains 40.5%, by weight, of isocyanurate and 59.5%, by weight, of monomeric tolylene diisocyanate. The NCO-content amounts to 38.5%, by weight.

EXAMPLE 18

1,000 parts, by weight, of the isocyanurate-isocyanate mixture produced in accordance with Example 15 are mixed with 60 parts, by weight, of an NCO-prepolymer produced from 174 parts, by weight, of a mixture of 80%, by weight, of 2,4- and 20%, by weight, of 2,6-tolylene diisocyanate and 567 parts, by weight, of an adipic acid-neopentyl glycol-1,6-hexane diol polyester having an OH-number of 67, and the excess isocyanate is removed in vacuo by means of a thin-layer evaporator. The resin isolated contains 21%, by weight, of NCO-groups and 0.3%, by weight, of free monomeric tolylene diisocyanate and has a melting point of from 116° to 124° C.

EXAMPLE 19

(Production of an isocyanurate-isocyanate mixture to be worked-up in accordance with the present invention)

1,000 parts, by weight, of 1-isocyanato-3,3,5-trimethyl-5-isocyanatomethyl cyclohexane are stirred at 50° C. in the absence of moisture with 4 parts, by weight, of the potassium salt of ethyl hexanoic acid until the NCO-content has fallen to 30.7%, by weight. The trimerization reaction is stopped by adding 2 parts, by weight, of phosphoric acid. The solution obtained contains 38%, by weight, of isocyanurate and 62%, by weight, of monomric 1-isocyanato-3,3,5-trimethyl-5-isocyanatomethyl cyclohexane.

EXAMPLE 20

1,000 parts, by weight, of the isocyanurate-isocyanate mixture produced in accordance with Example 19 are mixed with 38 parts, by weight, of castor oil, after which the excess isocyanate is removed in vacuo at 210° C. by means of a thin-layer evaporator. The resin isolated contains 15.8%, by weight, of NCO-groups and 0.4%, by weight, of 1-isocyanato-3,3,5-trimethyl-5-isocyanatomethyl cyclohexane and has a melting point of 85° C.

What is claimed is:

1. A process for the production of polyisocyanates of isocyanurate structure containing at least 50%, by weight, of tris-isocyanatomonoisocyanurates and at most 3%, by weight, of diisocyanate free from isocyanurate groups comprising:
   (a) catalytically trimerizing organic diisocyanates free from isocyanurate groups, selected from the group consisting of 2,4-diisocyanatotoluene, 2,6-diisocyanatotoluene, and 1-isocyanato-3,3,5-trimethyl-5-isocyanatomethyl cyclohexane and mixtures thereof,
   (b) terminating the trimerization reaction by deactivation of the catalyst after from 5 to 40% of the isocyanate groups of the isocyanurate-free diisocyanate have been trimerized, and
   (c) removing the unreacted isocyanurate-free diisocyanate present in the reaction mixture from the reaction mixture by distillation, said distillation being carried out in the presence of from 1, to 30%, by weight, based on the end product obtained as distillation residue, of a liquid distillation aid which is inert under the distillation conditions and which boils at a temperature at least 50° C. above the boiling point of the isocyanurate-free diisocyanate.
2. Polyisocyanates of isocyanurate structure obtained by the partial trimerization of the isocyanate groups of 2,4- and optionally, 2,6,-diisocyanatotoluene, characterized by a content of at least 50%, by weight, of tris-(isocyanatotolyl)-isocyanurate and a content of less than 3%, by weight, of free 2,4- and/or 2,6-diisocyanatotoluene.

3. Polyisocyanates of isocyanurate structure obtained by the partial trimerization of the isocyanate groups of 1-isocyanato-3,3,5-trimethyl-5-isocyanatomethyl cyclohexane, characterized by a content of at least 50%, by weight, of tris-[(1,3,3-trimethyl-5-isocyanatocyclohexyl)-methyl]-isocyanurate and a content of less than 3%, by weight, of free 1-isocyanato-3,3,5-trimethyl-5-isocyanatomethyl cyclohexane.

* * * * *